United States Patent
Koto

(10) Patent No.: US 11,001,171 B2
(45) Date of Patent: May 11, 2021

(54) VEHICLE SEAT SLIDE DEVICE

(71) Applicant: SHIROKI CORPORATION, Fujisawa (JP)

(72) Inventor: Masatoshi Koto, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 5 days.

(21) Appl. No.: 16/526,252

(22) Filed: Jul. 30, 2019

(65) Prior Publication Data

US 2020/0039391 A1 Feb. 6, 2020

(30) Foreign Application Priority Data

Aug. 3, 2018 (JP) .............................. JP2018-146402

(51) Int. Cl.
*B60N 2/00* (2006.01)
*B60N 2/08* (2006.01)

(52) U.S. Cl.
CPC ......... *B60N 2/0881* (2013.01); *B60N 2/0818* (2013.01)

(58) Field of Classification Search
CPC .. B60N 2/015; B60N 2/01525; B60N 2/0155; B60N 2/01508; B60N 2/01516
USPC ................................................. 248/424, 429
See application file for complete search history.

(56) References Cited

U.S. PATENT DOCUMENTS

| | | | | |
|---|---|---|---|---|
| 10,406,942 B2 * | 9/2019 | Kimura | ................. | B60N 2/0715 |
| 10,464,447 B2 * | 11/2019 | Kimura | ................. | B60N 2/0705 |
| 2015/0090853 A1 * | 4/2015 | Arakawa | .............. | B60N 2/0725 |
| | | | | 248/429 |
| 2015/0090854 A1 * | 4/2015 | Hayashi | ............... | B60N 2/0715 |
| | | | | 248/429 |
| 2015/0306981 A1 * | 10/2015 | Arakawa | .............. | B60N 2/0818 |
| | | | | 248/429 |
| 2017/0036569 A1 * | 2/2017 | Sato | ..................... | B60N 2/0806 |

FOREIGN PATENT DOCUMENTS

| | | |
|---|---|---|
| JP | 2006044532 A | 2/2006 |
| JP | 2018052207 A | 4/2018 |

* cited by examiner

*Primary Examiner* — Steven M Marsh
(74) *Attorney, Agent, or Firm* — Buchanan, Ingersoll & Rooney PC

(57) ABSTRACT

A vehicle seat slide device includes an upper rail, a lower rail, a lock mechanism that restricts movement of the upper rail relative to the lower rail, and a lock release mechanism that performs an unlocking action with the lock mechanism. The lock release mechanism includes an input lever and a release lever. The release lever includes a longitudinal extension, a widthwise extension, and a vertical extension. The release lever is configured so that the vertical extension presses an unlock element as the input lever presses the widthwise extension from above.

6 Claims, 9 Drawing Sheets

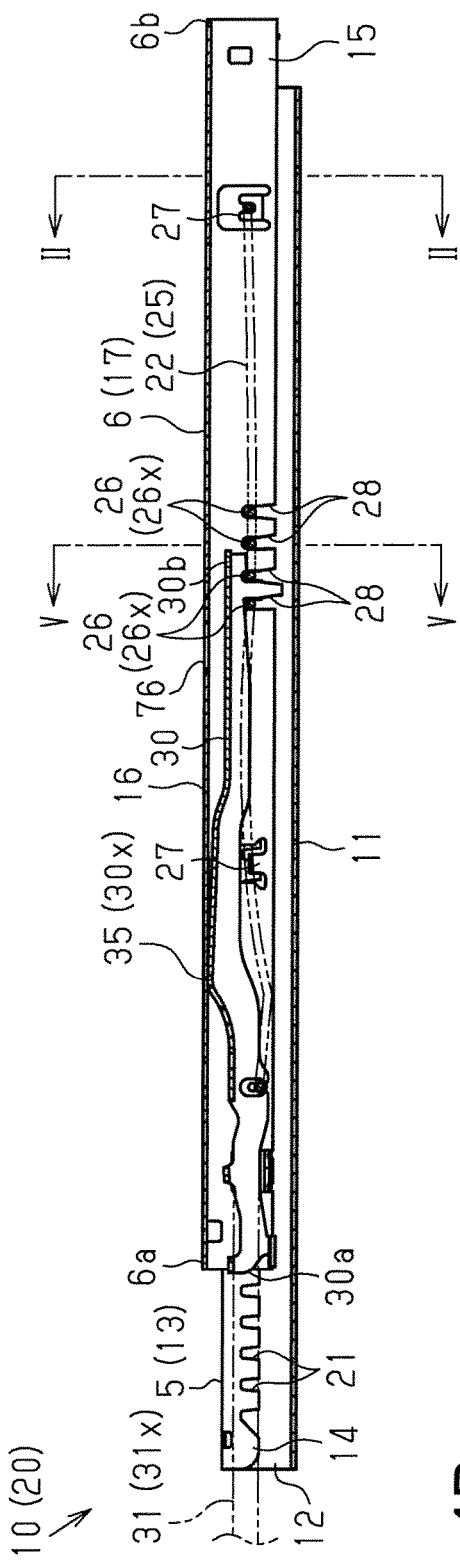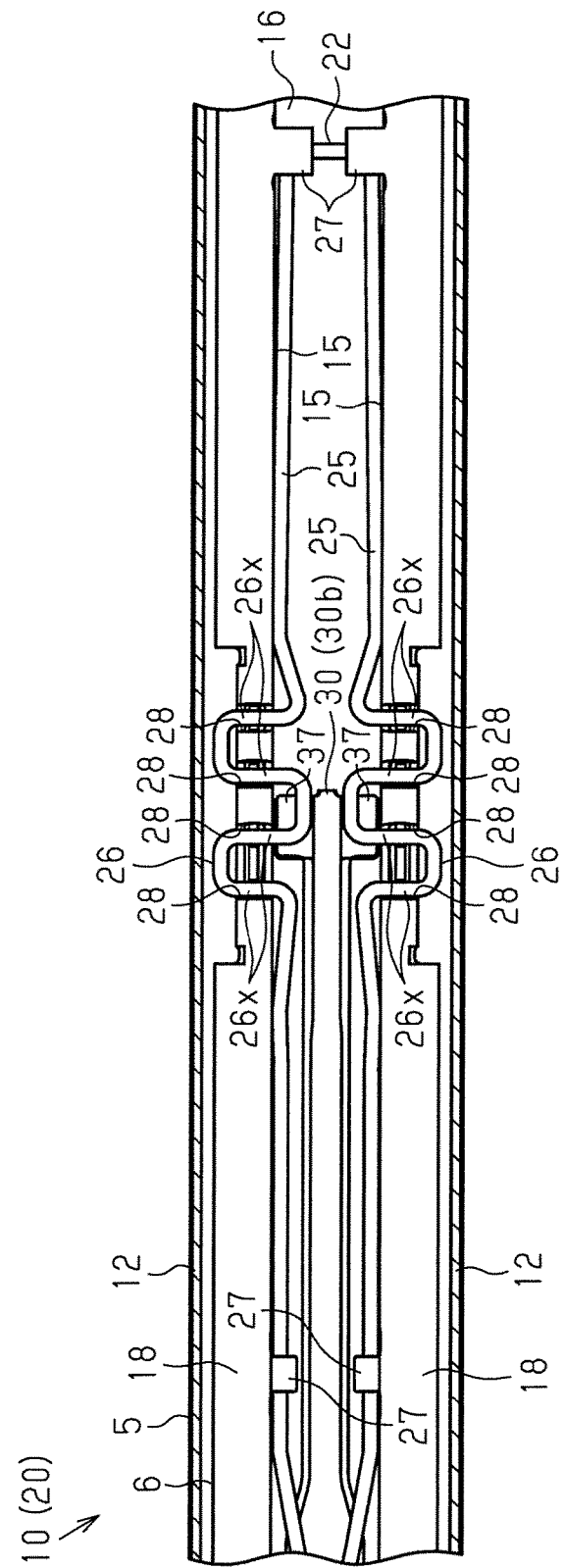

Initial Position

Middle Position

Unlock Position

VEHICLE SEAT SLIDE DEVICE

BACKGROUND

1. Field

The present disclosure relates to a vehicle seat slide device.

2. Description of Related Art

A typical vehicle seat slide device includes an upper rail, a lower rail, and a lock mechanism. The upper rail supports a seat located above the upper rail. The lower rail supports the upper rail so that the upper rail and lower rail are movable relative to each other. The lock mechanism restricts movement of the upper rail relative to the lower rail. Such a seat slide device may also include a lock release mechanism allowing the lock mechanism to perform an unlocking action based on an operating force input by a transmitting member. Japanese Laid-Open Patent Publication No. 2018-52207 discloses an example of a lock release mechanism that includes a lever member pivoted when pulled by a wire cable that transmits an operating force based on a forward tilting operation of a seat back performed in cooperation with a reclining device. The movement of the upper rail relative to the lower rail is permitted when the lever member presses an unlock element (lock member) of the lock mechanism so that the lock mechanism performs an unlocking action.

The operability of a vehicle seat needs to be improved. Japanese Laid-Open Patent Publication No. 2006-44532 discloses an example of a lock release mechanism that is formed by a combination of a first lever pivoted when pulled by a wire cable and a second lever pivoted when pressed by the first lever. By optimizing the link ratio with such a mechanism, the unlock element can be pressed in a stable manner with a smaller operating force. The use of the lock release mechanism to perform an unlocking action with the lock mechanism improves operability.

However, the arrangement of the two levers as described above occupies a large space. This may adversely affect the mountability on the upper rail. Thus, there is still room for improvement in this respect.

SUMMARY

It is an objective of the present disclosure to provide a vehicle seat slide device that reduces the size of a lock release mechanism while obtaining superior operability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle seat slide device includes, an upper rail that supports a seat located above the upper rail, a lower rail that supports the upper rail so that the upper rail is movable relative to the lower rail, a lock mechanism that restricts movement of the upper rail relative to the lower rail, and a lock release mechanism that permits movement of the upper rail relative to the lower rail by performing an unlocking action with the lock mechanism based on an operating force received from a transmitting member. The lock release mechanism includes an input lever connected to the transmitting member, and a release lever that presses an unlock element of the lock mechanism and performs the unlocking action with the lock mechanism when pressed and pivoted by the input lever that is pivoted based on the operating force. The release lever includes a longitudinal extension, which extends toward the input lever in a longitudinal direction of the upper rail, a widthwise extension, which extends in a widthwise direction of the upper rail, and a vertical extension, which extends in a vertical direction of the upper rail. The longitudinal extension, the widthwise extension, and the vertical extension are integral. The release lever is configured so that the vertical extension presses the unlock element as the input lever presses the widthwise extension from above.

Other features and aspects will be apparent from the following detailed description, the drawings, and the claims.

BRIEF DESCRIPTION OF THE DRAWINGS

FIG. 4A is a cross-sectional view of the seat slide device (taken along line IVa-IVa in FIG. 2).

FIG. 4B is a bottom view of the seat slide device.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a vehicle seat slide device will now be described with reference to the drawings.

Figure 1:
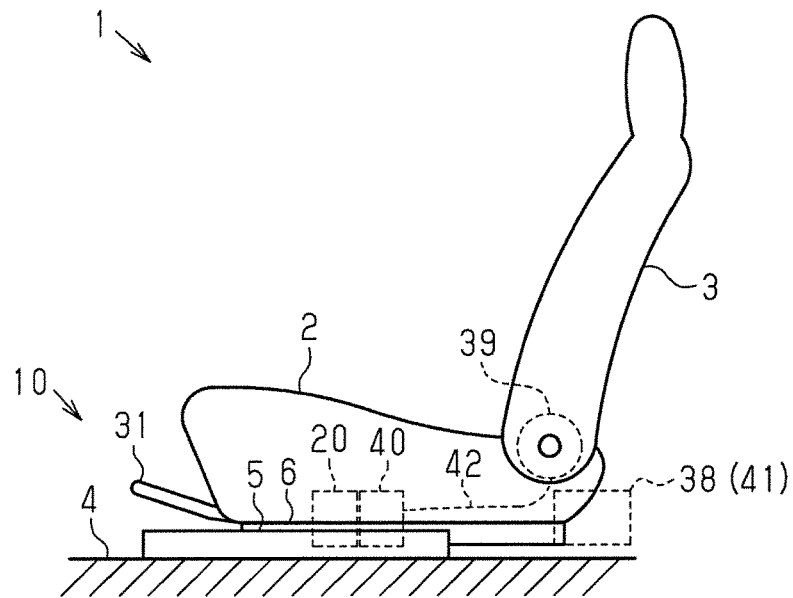
FIG. 1 is a schematic view of a vehicle seat and a seat slide device.

As shown in FIG. 1, a vehicle seat 1 includes a seat cushion 2 and a seat back 3 arranged at the rear end of the seat cushion 2 in an inclinable manner. Right and left lower rails 5, which extend in the front-rear direction of the vehicle (right-left direction in FIG. 1), are arranged on a vehicle floor 4. For the sake of brevity, only one of the two lower rails 5 is shown in FIG. 1 and the other drawings. Further, an upper rail 6, which moves on the lower rail 5 relative to the lower rail 5 in a direction in which the lower rail 5 extends (longitudinal direction), is attached to each lower rail 5. The seat 1 is supported above the upper rails 6.

A vehicle with the seat 1 of the present embodiment includes a seat slide device 10 formed by the lower rails 5 and the upper rails 6. The seat slide device 10 allows positioning of the seat 1 in the front-rear direction of the vehicle. That is, the seat slide device allows the slide position of the seat 1 to be adjusted.

Figure 2:
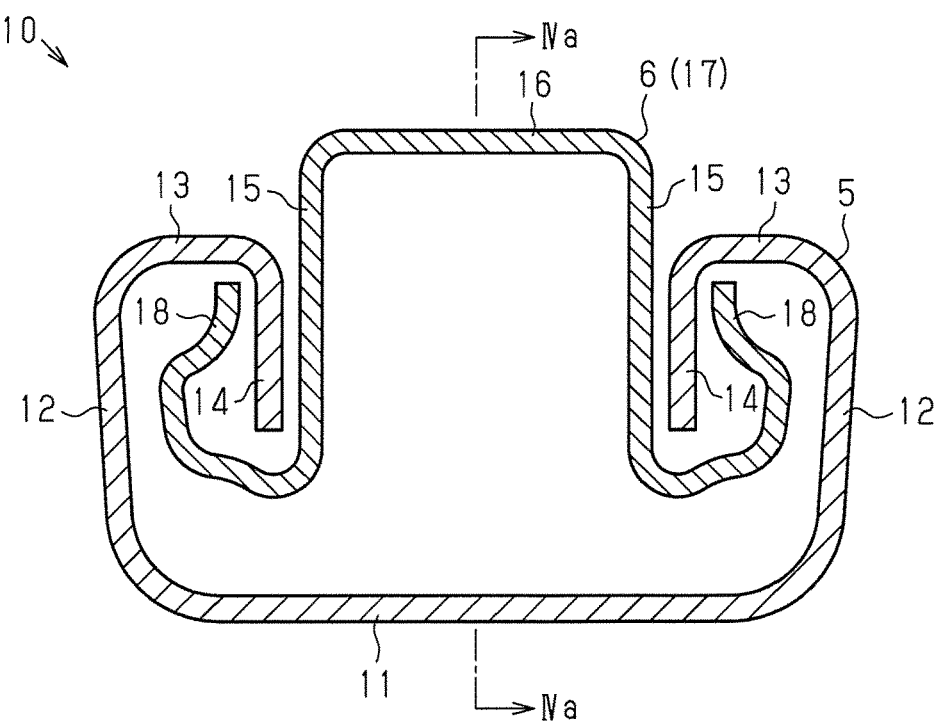
FIG. 2 is a cross-sectional view of the seat slide device (taken along line II-II in FIG. 4A).
Figure 3:
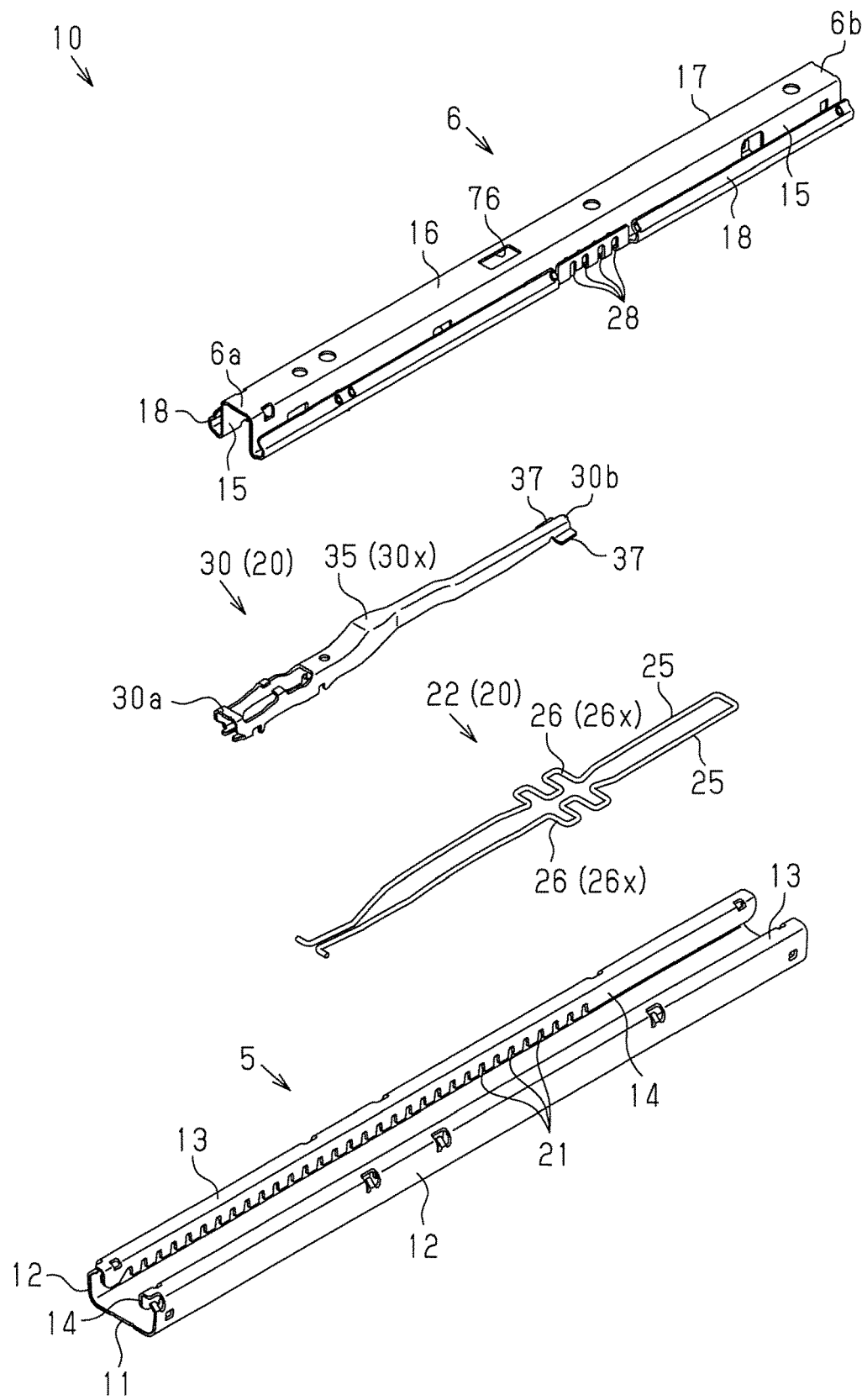
FIG. 3 is an exploded perspective view of the seat slide device.

Specifically, as shown in FIGS. 2 and 3, the lower rail 5 includes a substantially flat bottom wall 11, which serves as a fixing portion fixed to the vehicle floor 4 (refer to FIG. 1). An outer wall 12 extends from the bottom wall 11 at the ends in the widthwise direction (right-left direction in FIG. 2). The upper ends of the outer walls 12 (ends at the upper side in FIG. 2) are flanged so that upper walls 13 extend inward in the widthwise direction. The distal ends of the upper walls 13 are bent so that inner walls 14 extend downward.

The upper rail 6 includes two side walls 15, which are opposed to each other in the widthwise direction. The upper rail 6 also includes a flat upper wall 16 connecting the side walls 15. The upper rail 6 in the present embodiment is coupled to the lower rail 5 so that a body 17, which is defined by the side walls 15 and the upper wall 16 that form a substantially U-shaped cross section, is located between the inner walls 14 of the lower rail 5.

Further, in the upper rail 6 according to the present embodiment, the lower ends of the side walls 15 are bent so that bent portions 18 extend outward in the widthwise direction. The bent portions 18 are arranged in a space defined by the outer walls 12, the upper walls 13, and the inner walls 14 of the lower rail 5 to restrict movement in the upward and widthwise directions relative to the lower rail 5.

Spherical rolling elements (not shown) are located between each outer wall 12 of the lower rail 5 and the corresponding bent portions 18 of the upper rail 6, which are opposed to each other in the widthwise direction as described above. The rolling elements contact and roll along the outer walls 12 of the lower rail 5 and the bent portions 18 of the upper rail 6 so that the upper rail 6 moves smoothly relative to the lower rail 5 in the seat slide device 10 according to the present embodiment.

Further, as shown in FIGS. 3 to 6, the seat slide device 10 according to the present embodiment includes a lock mechanism 20 that restricts and allows movement of the upper rail 6 relative to the lower rail 5.

Figure 5:
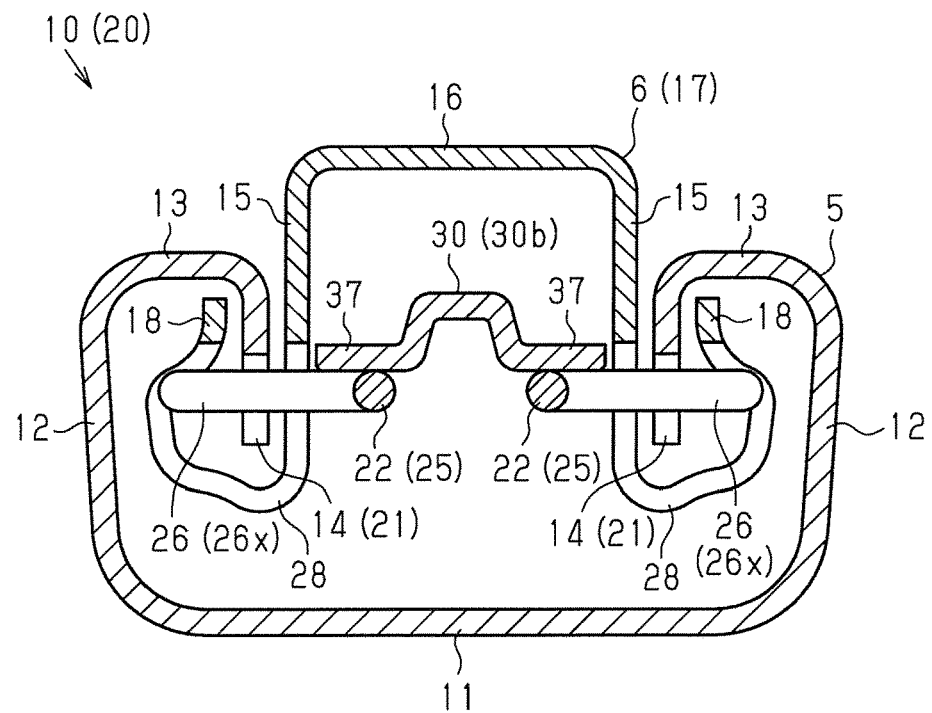
FIG. 5 is a cross-sectional view of the seat slide device in a lock state (taken along line V-V in FIG. 4A).
Figure 6:
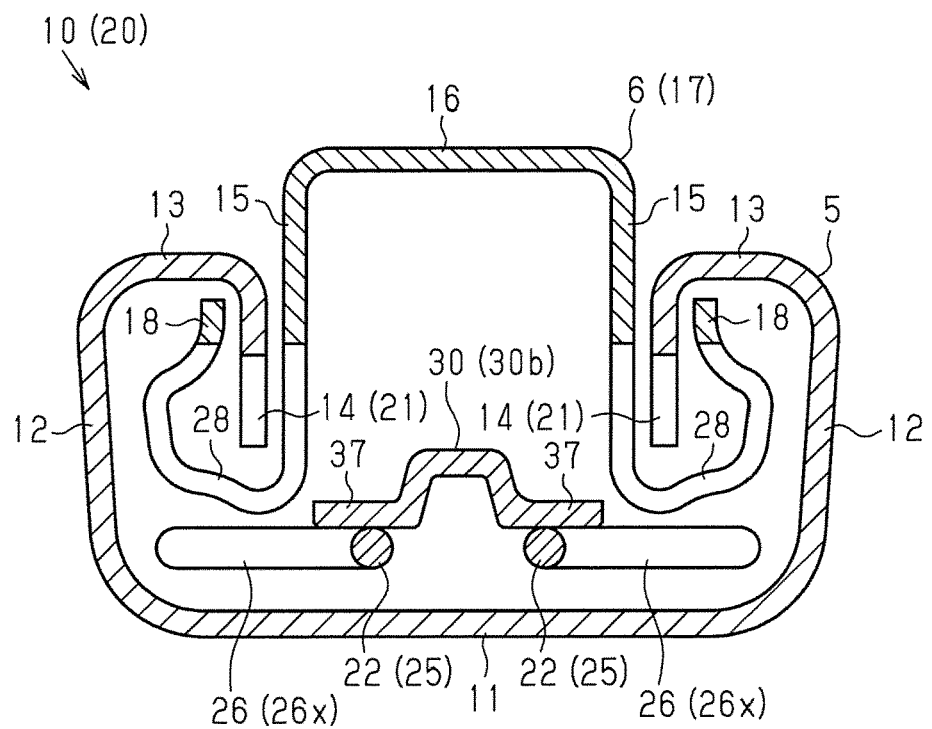
FIG. 6 is a cross-sectional view of the seat slide device in an unlock state (taken along line V-V in FIG. 4A).

Specifically, the lower rail 5 according to the present embodiment includes engagement grooves 21 arranged in the longitudinal direction (right-left direction in FIG. 4A and direction perpendicular to the planes of FIGS. 5 and 6). In the lower rail 5 according to the present embodiment, the engagement grooves 21 are arranged at equal intervals by cutting out slits in the lower ends of the inner walls 14, which extend downward from the distal ends of the upper walls 13. The lock mechanism 20 according to the present embodiment includes a lock spring 22 that engages the engagement grooves 21 in a state supported by the upper rail 6.

Specifically, the lock spring 22 according to the present embodiment includes a pair of spring portions 25 formed by bending a wire into two. The spring portions 25 of the lock spring 22 are arranged inside the body 17 to extend in the longitudinal direction of the upper rail 6. Each spring portion 25 includes a crank-shaped undulation 26, which is formed by bending the spring portion 25 a number of times at a substantially right angle. The undulations 26 of the lock spring 22 according to the present embodiment engage the engagement grooves 21 arranged on the lower rail 5.

More specifically, as shown in FIGS. 4A and 4B, the upper rail 6 according to the present embodiment includes engaging portions 27 that support the spring portions 25 of the lock spring 22, which is arranged inside the body 17, from below. The engaging portions 27 of the upper rail 6 according to the present embodiment are formed by partially cutting out the side walls 15 of the upper rail 6 and bending the cut-out parts of the side walls 15 to extend inward in the widthwise direction of the upper rail 6. Thus, the engaging portions 27 extend inward from the side walls 15 in the U-shaped cross section of the upper rail 6.

Further, as shown in FIGS. 3 to 6, the undulations 26 in the spring portions 25 of the lock spring 22 according to the present embodiment include widthwise extensions 26$x$ (four in the present embodiment) that extend in the widthwise direction of the upper rail 6. The upper rail 6 according to the present embodiment includes insertion holes 28 (four in the present embodiment) formed by cutting out slits in lower portions of the side walls 15 and the bent portions 18.

As shown in FIGS. 4A to 5, the lock spring 22 according to the present embodiment is held by the upper rail 6 in a state in which the widthwise extensions 26$x$, which are formed by the undulations 26 of the spring portions 25, are arranged inside the insertion holes 28, which are formed in the upper rail 6. The widthwise extensions 26$x$ of the lock spring 22 projecting outward from the body 17 in the widthwise direction of the upper rail 6 through the insertion holes 28 are arranged in the engagement grooves 21 formed in the lower rail 5. Thus, the lock spring 22, which is held by the upper rail 6, engages the engagement grooves 21 of the lower rail 5 so that the lock mechanism 20 according to the present embodiment restricts movement of the upper rail 6 relative to the lower rail 5 in the longitudinal direction, or the slide movement of the seat 1.

As shown in FIGS. 3 to 6, the lock mechanism 20 according to the present embodiment includes an unlock lever 30 having the form of a substantially elongated bar extending in the longitudinal direction of the upper rail 6. Further, the lock mechanism 20 according to the present embodiment includes a loop handle 31 (refer to FIG. 1) connected to the unlock lever 30 in a state located frontward from the seat 1. The lock mechanism 20 according to the present embodiment disengages the lock spring 22 from the engagement grooves 21 of the lower rail 5 when an operating force is input to the loop handle 31 and transmitted to the lock spring 22 by the unlock lever 30.

Specifically, as shown in FIG. 4A, the unlock lever 30 according to the present embodiment overlaps the lock spring 22, which is arranged inside the body 17, from above at a first end 6$a$ of the upper rail 6 located at the front side of the vehicle (left side in FIG. 4A).

Further, the unlock lever 30 according to the present embodiment includes a projection 35 that defines a pivotal fulcrum 30x of the unlock lever 30 when abutting against the upper wall 16 of the upper rail 6 from below (lower side in FIG. 4A). A first end 30a of the unlock lever 30 located at the first end 6a of the upper rail 6 is connected to an inserted portion 31x of the loop handle 31 that is inserted into the body 17 from the first end 6a of the upper rail 6. A second end 30b of the unlock lever 30 according to the present embodiment, which is located toward the rear of the vehicle, is arranged above the undulations 26 of the spring portions 25 of the lock spring 22.

With the lock mechanism 20 according to the present embodiment, when the loop handle 31 is lifted, the first end 30a of the unlock lever 30 connected to the loop handle 31 is moved upward. This pivots the unlock lever 30 about the pivotal fulcrum 30x (clockwise in FIG. 4A). Further, as shown in FIG. 6, the pivoting downwardly moves the second end 30b of the unlock lever 30, which lowers the lock spring 22 in abutment with the bent undulations 26 of the spring portions 25. This flexes the lock spring 22 so that the lock mechanism 20 according to the present embodiment disengages the lock spring 22 from the engagement grooves 21 of the lower rail 5.

The seat slide device 10 according to the present embodiment allows for adjustment of the slide position of the seat 1 with the lock mechanism 20 by keeping the loop handle 31 lifted. When the user releases the loop handle 31, the seat 1 can be fixed at the desired slide position.

Lock Release Mechanism

A lock release mechanism of the seat slide device 10 according to the present embodiment will now be described.

As shown in FIG. 1, the seat slide device 10 according to the present embodiment includes a lock release mechanism 40 that cooperates with a reclining device (recliner) 39 to perform an unlocking action with the lock mechanism 20 when an operation unit 38 arranged on the seat 1 is operated.

Specifically, the seat 1 according to the present embodiment includes a foot lever 41, which serves as the operation unit 38, at the rear lower side of the seat cushion 2. Further, the reclining device 39 of the seat 1 according to the present embodiment tilts the seat back 3 forward when the foot lever 41 is operated. An operating force input to the foot lever 41 is transmitted by a wire cable 42 to the lock release mechanism 40 arranged in the seat slide device 10. This implements a walk-in function that allows for adjustment of the slide position of the seat 1 according to the present embodiment while the seat back 3 is tilted forward.

As shown in FIGS. 7 to 11, the lock release mechanism 40 according to the present embodiment includes an input lever 51 and a release lever 52. The input lever 51 is pivoted by an operating force received from the wire cable 42. The release lever 52 is pressed and pivoted by the input lever 51 so that the lock mechanism 20 performs an unlocking action. The lock release mechanism 40 according to the present embodiment includes a support bracket 53 fixed to the upper rail 6 in a state pivotally supporting the input lever 51 and the release lever 52.

Specifically, the support bracket 53 according to the present embodiment includes a substantially flat base 54 fixed to the upper wall 16 of the upper rail 6 from above (upper side in FIGS. 7 and 9) and support walls 55, 56 that extend from one end of the base 54. The support bracket 53 of the seat slide device 10 according to the present embodiment is formed by processing a sheet of metal. Further, the support bracket 53 according to the present embodiment includes holes 57, 58 that extend through the support walls 55, 56 in the thickness direction (vertical direction in FIG. 8, right-left direction in FIG. 9). Shaft members (hinge pins) 61, 62 are fitted into the holes 57, 58 to serve as support shafts 51x, 52x of the input lever 51 and the release lever 52, respectively.

The input lever 51 and the release lever 52 according to the present embodiment include insertion holes 63, 64 into which the shaft members (hinge pins) 61, 62 are inserted, respectively. Thus, the input lever 51 is supported pivotally about the support shaft 51x defined by the shaft member 61, which is supported by the support wall 55, and the release lever 52 is supported pivotally about the support shaft 52x defined by the shaft member 62, which is supported by the support wall 56.

Further, the base 54 of the support bracket 53 according to the present embodiment is fixed to the upper wall 16 of the upper rail 6 so that the input lever 51 and the release lever 52 supported by the support walls 55, 56 are lined in the longitudinal direction (right-left directions in FIGS. 7 and 8 and direction perpendicular to plane of FIG. 9) of the upper rail 6, namely, in the front-rear direction of the vehicle. Specifically, the support bracket 53 is fixed to the upper rail 6 so that the input lever 51 supported by the support wall 55 is arranged toward a second end 6b of the upper rail 6 (right sides in FIGS. 7 and 8, right sides in FIGS. 3, 4A, and 4B) from the release lever 52 supported by the support wall 56, that is, toward the rear side of the vehicle. The support walls 55, 56 of the support bracket 53 according to the present embodiment pivotally support the input lever 51 and the release lever 52 at an outer side of the support walls 55, 56 in the widthwise direction of the upper rail 6 (lower side in FIG. 8 and left side in FIG. 9).

The input lever 51 and the release lever 52 of the seat slide device 10 according to the present embodiment are formed by processing a sheet of metal. The support bracket 53 is fixed to the upper wall 16 of the upper rail 6 using a rivet 65 (POP rivet).

Further, in a state in which the support bracket 53 according to the present embodiment is fixed to the upper rail 6, the insertion hole 63 of the input lever 51, which is supported by the support wall 55, and the insertion hole 64 of the release lever 52, which is supported by the support wall 56, are both located at positions separated outward in the widthwise direction from the body 17 of the upper rail 6. With the lock release mechanism 40 according to the present embodiment, interference of the input lever 51 and the release lever 52, which are supported by the support bracket 53, and the wire cable 42, which is connected to the input lever 51, with the upper rail 6 (and lower rail 5) is limited.

More specifically, the input lever 51 according to the present embodiment includes a first extension 71 that extends downward (toward lower side in FIG. 7) and has a hole 70 (connection portion) in a distal end 71a to which the wire cable 42 is connected. The input lever 51 according to the present embodiment is pivoted (counterclockwise in FIG. 7) when the first extension 71 is pulled by the wire cable 42. Specifically, the distal end 71a of the first extension 71 is bent to be substantially L-shaped and extend toward the first end 6a of the upper rail 6, that is, toward the front of the vehicle (leftward in FIGS. 7 and 8, leftward in FIGS. 3 and 4A). Thus, with the input lever 51 according to the present embodiment, the distal end 71a to which the wire cable 42 is connected is located at a position closer to the release lever 52.

Further, the input lever 51 according to the present embodiment includes a second extension 72 located on the side of the support shaft 51x opposite to the first extension 71. Specifically, the second extension 72 has the form of a crank and extends toward the first end 6a of the upper rail 6, inward in the widthwise direction (upper side in FIG. 8, right side in FIG. 9), and then toward the first end 6a again. The cranked form of the second extension 72 of the input lever 51 according to the present embodiment is obtained through a bending process. When the input lever 51 according to the present embodiment is pulled and pivoted by the wire cable 42, a distal end 72a of the second extension 72 of presses the release lever 52.

The release lever 52 according to the present embodiment includes a longitudinal extension 73 extending in the longitudinal direction of the upper rail 6 toward the rear side of the vehicle, more specifically, toward the input lever 51, which is located toward the second end 6b of the upper rail 6 in a state in which the support bracket 53 is fixed to the upper wall 16 of the upper rail 6. The release lever 52 includes a widthwise extension 74, which extends in the widthwise direction of the upper rail 6, and a vertical extension 75, which extends in the vertical direction.

Figure 12A:
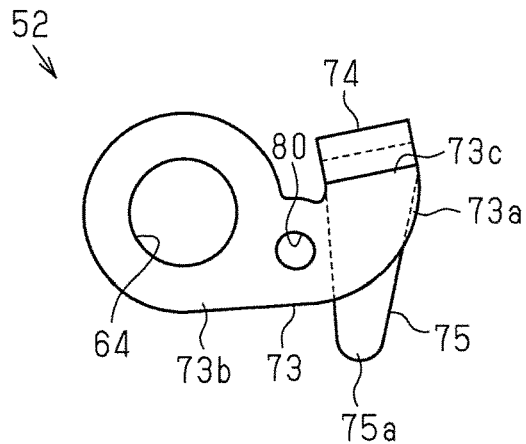
FIG. 12A is a side view of a release lever.
Figure 12B:
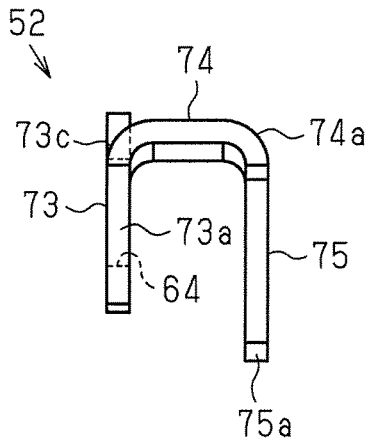
FIG. 12B is a front view of the release lever.
Figure 12C:
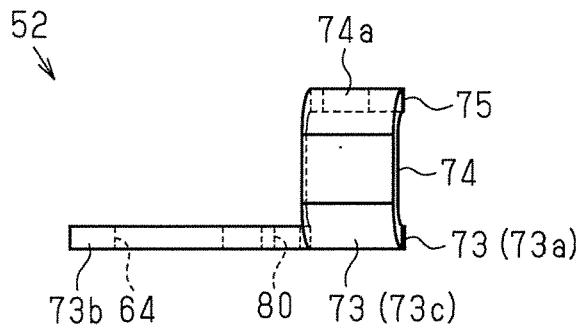
FIG. 12C is a plan view of the release lever.

Specifically, as shown in FIGS. 12A to 12C, the release lever 52 according to the present embodiment includes the insertion hole 64 in a proximal end 73b of the longitudinal extension 73. The shaft member 62 serving as the support shaft 52x is inserted into the insertion hole 64. The widthwise extension 74 and the vertical extension 75 are arranged at a distal end 73a of the longitudinal extension 73.

The widthwise extension 74 is continuous with an upper end 73c of the longitudinal extension 73 and extends toward one side (right side in FIG. 12B, upper side in FIG. 12C) in the thickness direction of the longitudinal extension 73. The vertical extension 75 is continuous with a distal end 74a of the widthwise extension 74, spaced apart from the longitudinal extension 73, and extended downward (toward lower sides in FIGS. 12A and 12B). The longitudinal extension 73, the widthwise extension 74, and the vertical extension 75 of the release lever 52 according to the present embodiment are formed by the same plate through a bending process. When viewed in the longitudinal direction of the upper rail 6 (when viewed from, for example, input lever 51), the longitudinal extension 73, the widthwise extension 74, and the vertical extension 75 of the release lever 52 according to the present embodiment form a substantially U-shape that is open downward.

Figure 7:
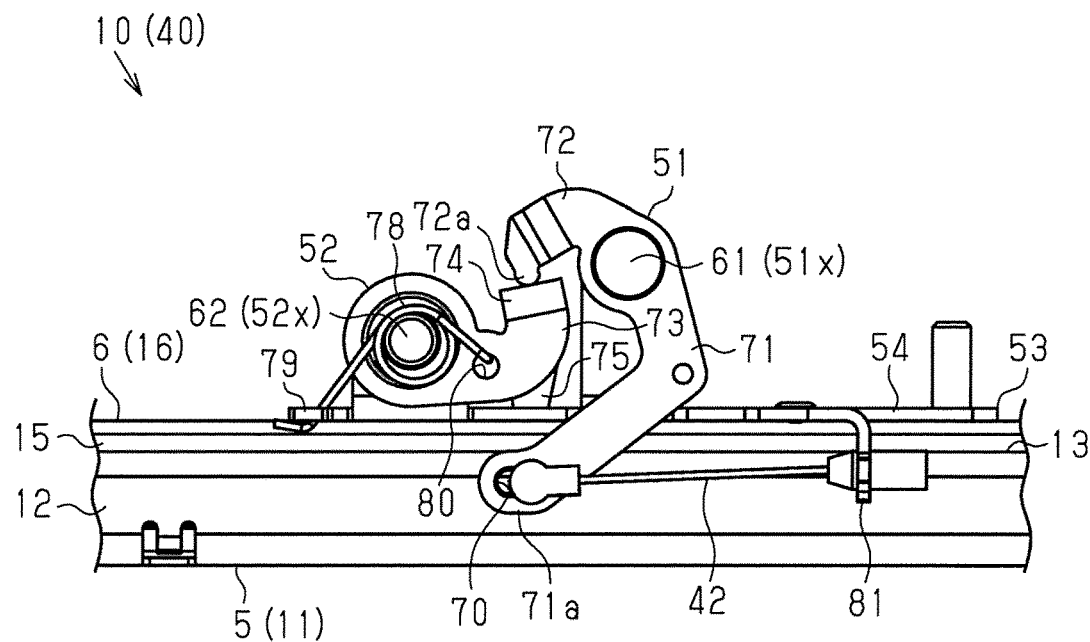
FIG. 7 is a side view of the lock release mechanism.
Figure 8:
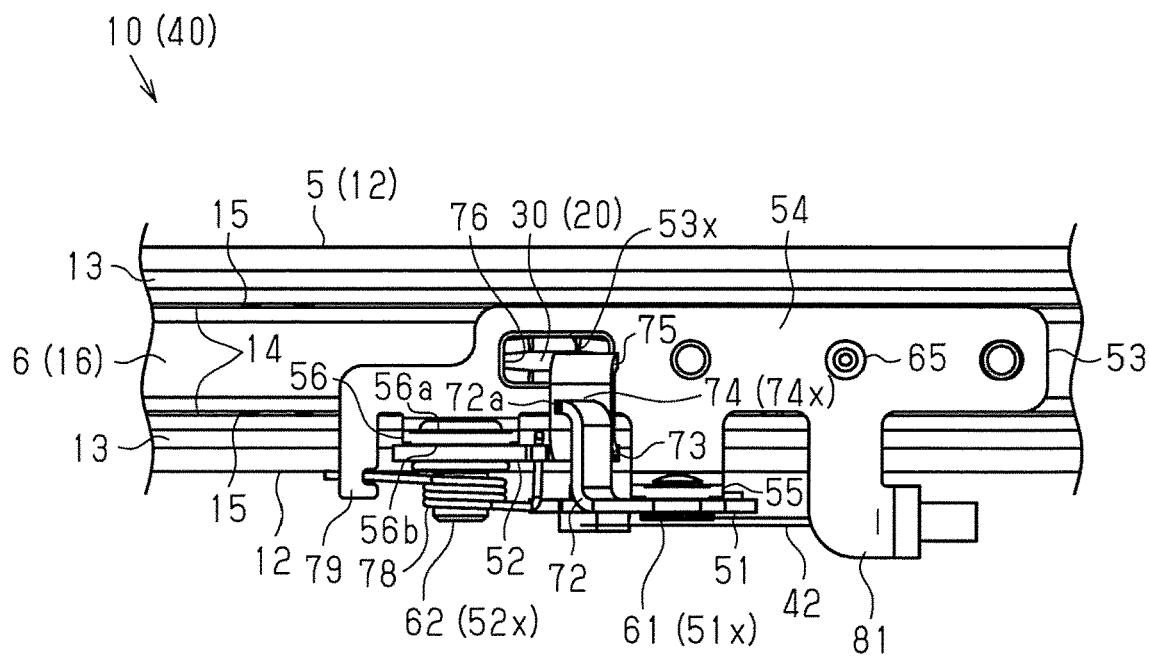
FIG. 8 is a plan view of the lock release mechanism.
Figure 9:
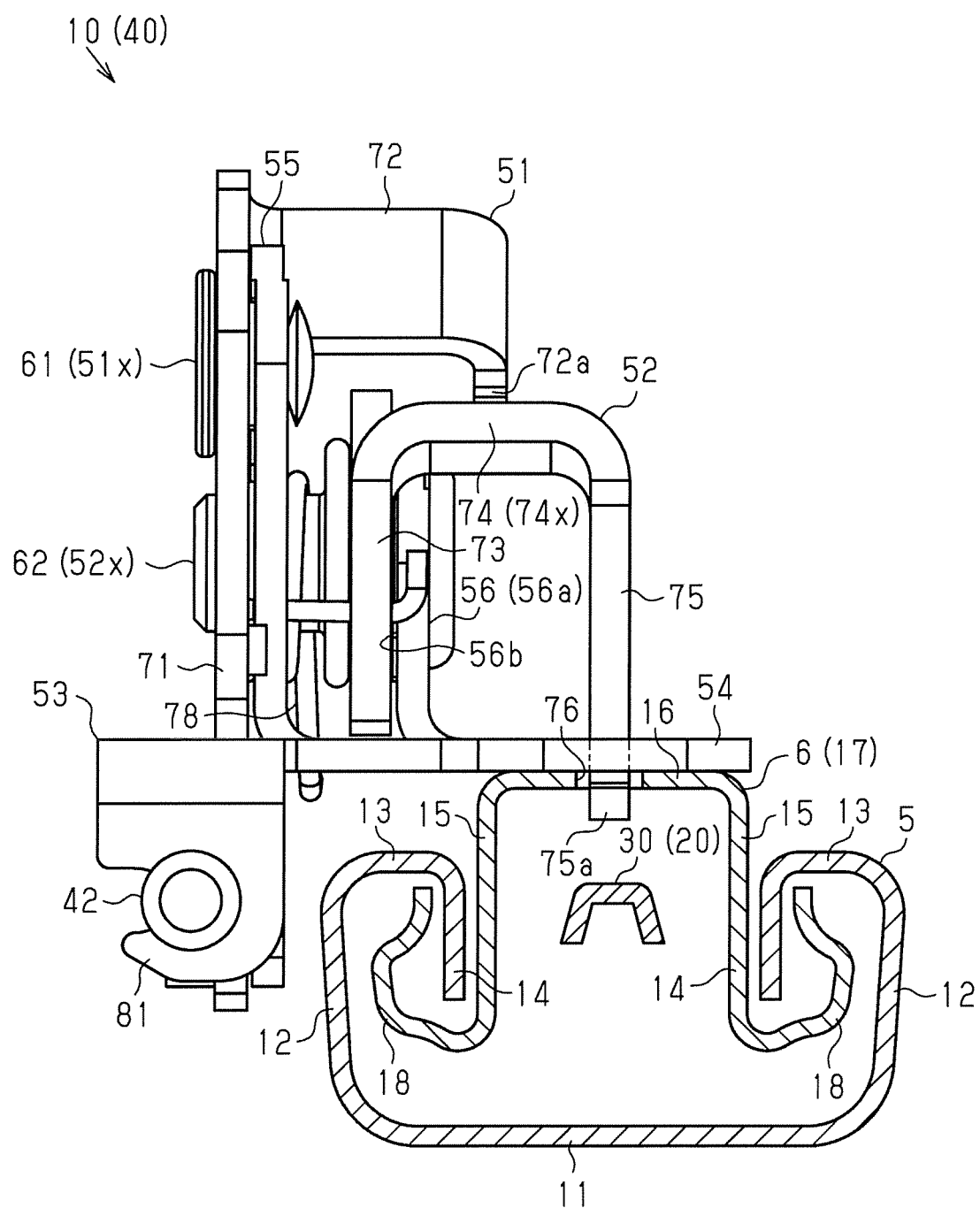
FIG. 9 is a front view of the lock release mechanism (view from rear of vehicle).
Figure 10:
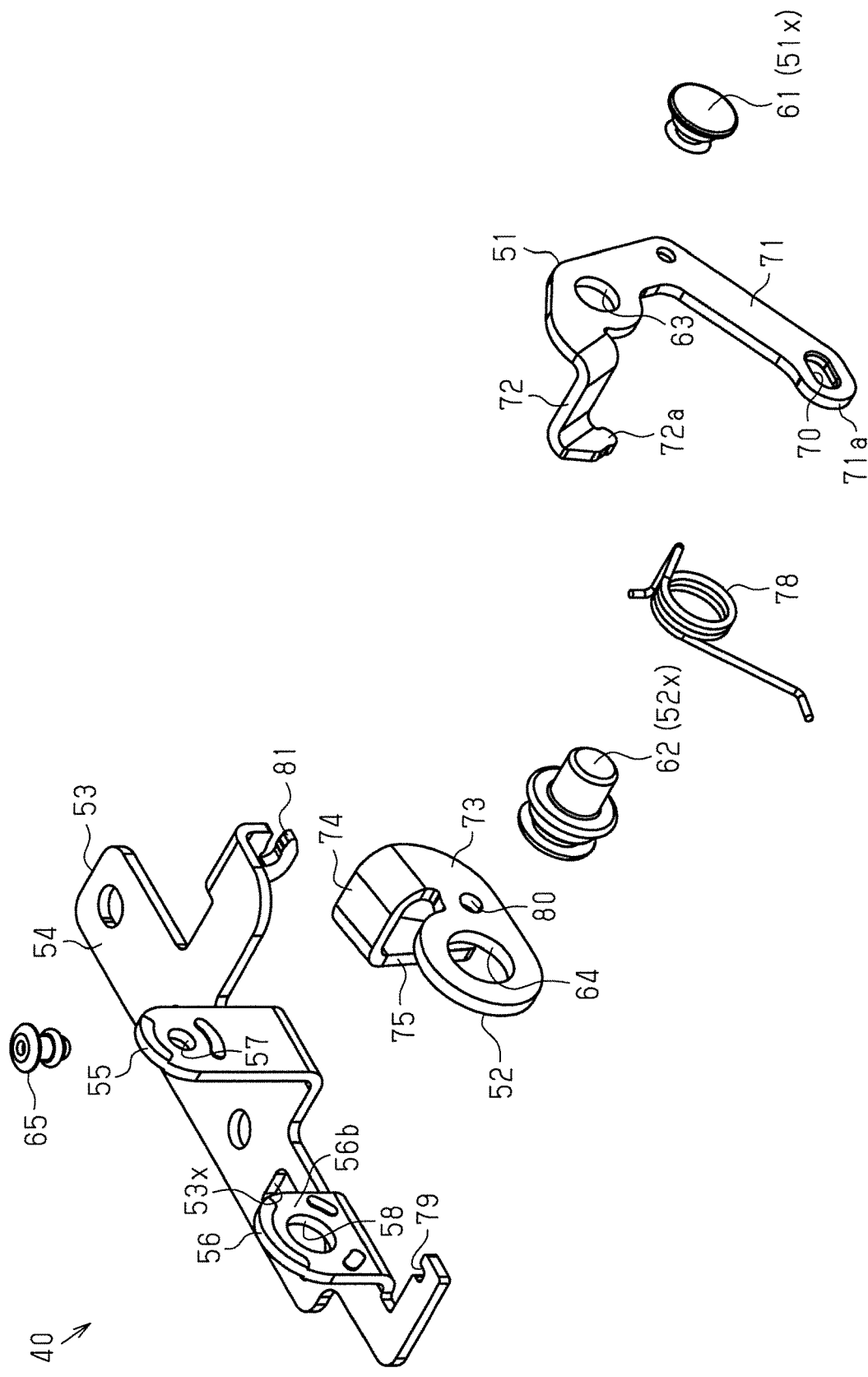
FIG. 10 is an exploded perspective view of the lock release mechanism.
Figure 11:
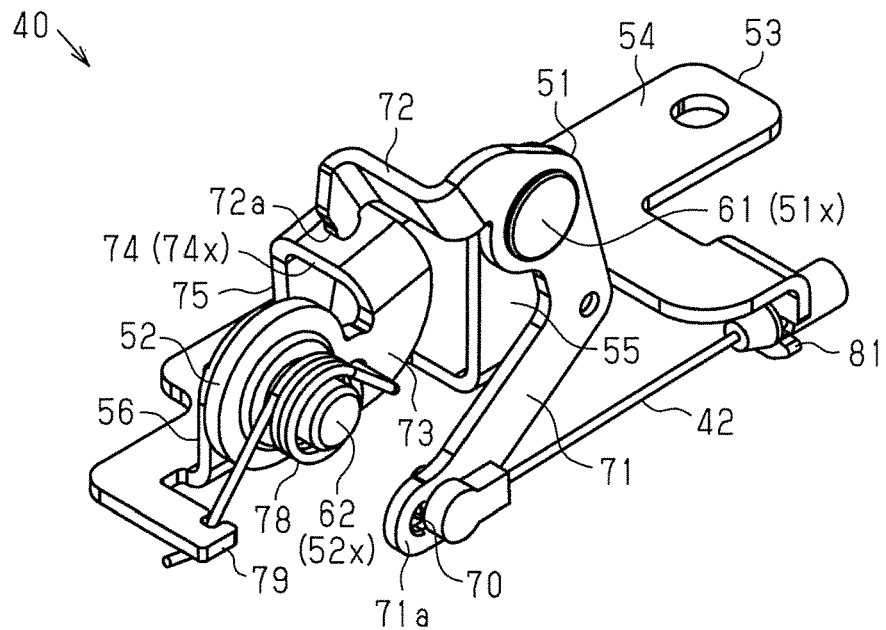
FIG. 11 is a perspective view of the lock release mechanism.

More specifically, as shown in FIGS. 7 to 9, the release lever 52 according to the present embodiment is supported by the support bracket 53 so that the distal end 72a of the second extension 72 of the input lever 51 is arranged above the widthwise extension 74. The upper wall 16 of the upper rail 6 according to the present embodiment includes a hole 76 (insertion hole), which is open upward. The support bracket 53 according to the present embodiment also includes a hole 53x arranged above the hole 76 when the support bracket 53 is fixed to the upper wall 16 of the upper rail 6. The release lever 52 according to the present embodiment is supported by the support bracket 53 so that a distal end 75a of the vertical extension 75 is inserted into the hole 76.

Figure 13A:
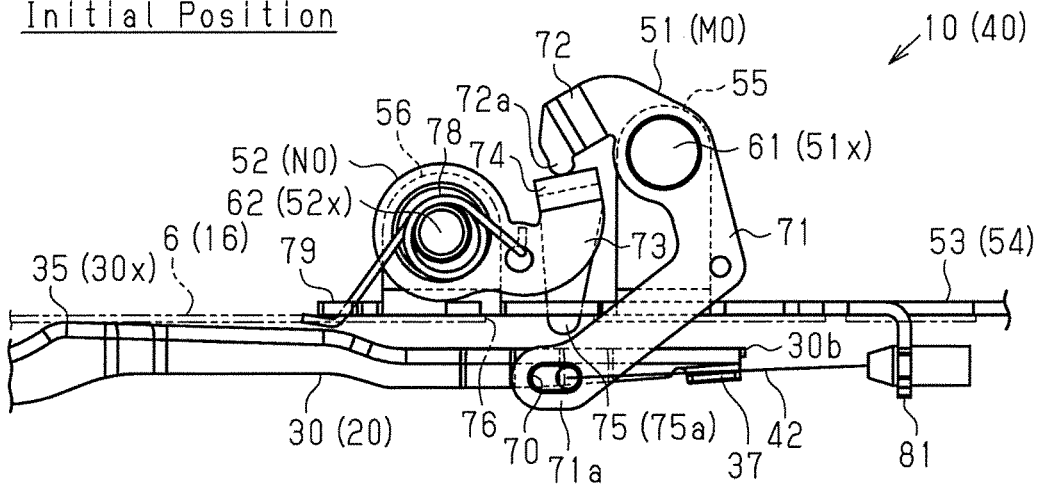
FIG. 13A is a diagram of the lock release mechanism in an initial position.
Figure 13B:
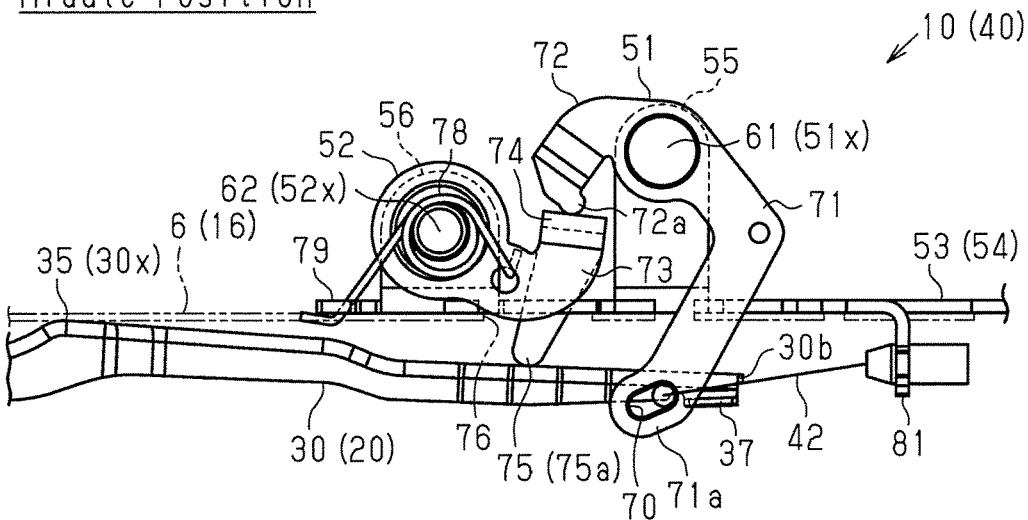
FIG. 13B is a diagram of the lock release mechanism in a middle position.
Figure 13C:
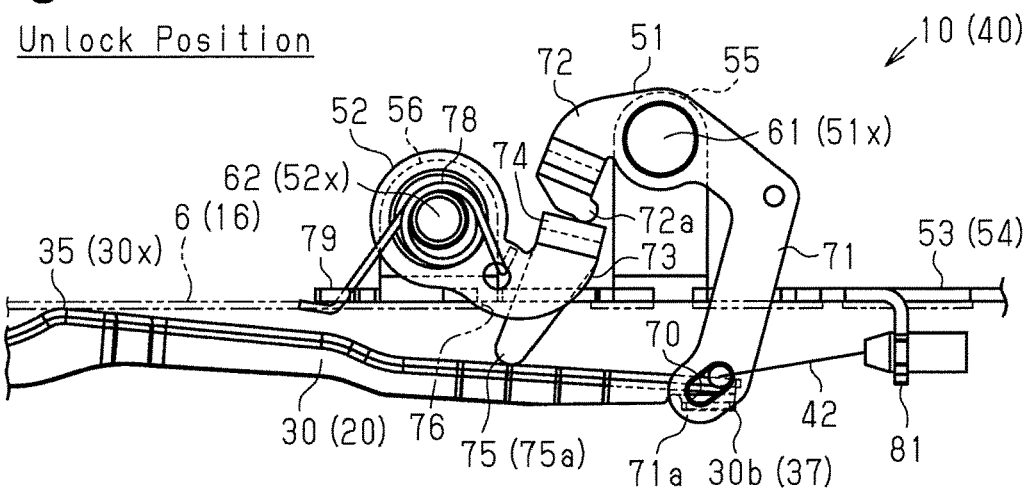
FIG. 13C is a diagram of the lock release mechanism in an unlock position.

As shown in FIGS. 13A to 13C, with the lock release mechanism 40 according to the present embodiment, when the input lever 51 is pulled and pivoted (counterclockwise in FIGS. 13A to 13C) by the wire cable 42, the second extension 72 (i.e., distal end 72a) of the input lever 51 presses the widthwise extension 74 of the release lever 52 from above (upper side in FIGS. 13A to 13C). This pivots (clockwise in FIGS. 13A to 13B) the release lever 52 and downwardly moves the vertical extension 75 (i.e., lower end 75a), which is inserted into the upper rail 6 (i.e., body 17), through the hole 76, which extends through the upper wall 16. The lock release mechanism 40 according to the present embodiment performs an unlocking action with the lock mechanism 20 when the downwardly moved vertical extension 75 of the release lever 52 presses the unlock lever 30 located inside the upper rail 6 (i.e., body 17).

Specifically, the projection 35 of the unlock lever 30 according to the present embodiment defines the pivotal fulcrum 30x abutting against the upper wall 16 of the upper rail 6 from below. When the unlock lever 30 is pivoted about the pivotal fulcrum 30x and the second end 30b is moved downward, a pressing portion 37 arranged at the second end 30b presses the lock spring 22, which is engaged with the lower rail 5. The lock mechanism 20 according to the present embodiment performs an unlocking action when the flexed lock spring 22 is disengaged from the lower rail 5 (refer to FIGS. 5 and 6).

With the lock release mechanism 40 according to the present embodiment, the vertical extension 75 of the release lever 52 is configured to press the unlock lever 30 from above, which serves as an unlock element of the lock mechanism 20, at the second end 30b in the longitudinal direction from the pivotal fulcrum 30x of the unlock lever 30. The second end 30b, which is located above the lock spring 22, pivots and downwardly moves (FIGS. 13A to 13C, clockwise) the unlock lever 30 in a direction that results in the lock mechanism 20 performing an unlocking action.

Further, as shown in FIG. 9, in the lock release mechanism 40 according to the present embodiment, the wall (15, 16) of the upper rail 6 located at the side (left side in FIG. 9) of the hole 76, which extends through the upper wall 16, that is closer to the support wall 56 of the release lever 52 is located between the longitudinal extension 73 and the vertical extension 75 of the release lever 52 in the widthwise direction of the upper rail 6. The release lever 52 according to the present embodiment is configured to pivot so that the walls (15, 16) of the upper rail 6 are arranged inside the U-shape, which is open downward and is substantially formed by the longitudinal extension 73, the widthwise extension 74, and the vertical extension 75.

The release lever 52 according to the present embodiment is formed so that the vertical extension 75 is spaced apart from the longitudinal extension 73 in the widthwise direction of the upper rail 6. The lock release mechanism 40 according to the present embodiment is formed so that the release lever 52 is pivotally supported with the widthwise extension 74 located above the side wall 15 and the upper wall 16 of the upper rail 6 that are located between the vertical extension 75 and the longitudinal extension 73. The lock release mechanism 40 according to the present embodiment allows the support shaft 52x of the release lever 52 to be set at a low position while avoiding interference between the release lever 52 and the upper rail 6.

As shown in FIG. 8, the release lever 52 of the present embodiment is pivotally supported by the outer side of support wall 56 in the widthwise direction of the upper rail 6 (lower side in FIG. 8). At position 74x at which the widthwise extension 74 is pressed by the input lever 51, the release lever 52 is located at the inner side of the support wall 56 in the widthwise direction (upper side in FIG. 8). Thus, in a state in which position 74x, which is where the widthwise extension 74 is pressed by the input lever 51, is arranged in a region facing a first surface 56a of the support wall 56, the release lever 52 is pivotally supported by the support shaft 52x, which is supported by the support wall 56 on a second surface 56b of the support wall 56, which is opposite to the first surface 56a. With the lock release mechanism 40 according to the present embodiment, when the widthwise extension 74 is pressed by the input lever 51, tilting of the release lever 52 in the widthwise direction of the upper rail 6 is limited and the release lever 52 can be smoothly pivoted.

As shown in FIGS. 11 and 13A to 13C, the lock release mechanism 40 according to the present embodiment includes a torsion coil spring 78 fitted onto the shaft member 62, which serves as the support shaft 52x of the release lever 52. The lock release mechanism 40 urges the release lever 52 with the elastic force of the torsion coil spring 78 in a direction (counterclockwise in FIGS. 13A to 13C) opposite to the pivoting direction (clockwise in FIG. 13A to 13C) when pressed by the input lever 51.

Specifically, the torsion coil spring 78 according to the present embodiment has one end engaged with an engaging portion 79 arranged on the base 54 of the support bracket 53 and another end engaged with a hole 80 extending through the longitudinal extension 73 of the release lever 52. The lock release mechanism 40 according to the present embodiment returns the release lever 52 with the urging force (elastic force) of the torsion coil spring 78 to initial position NO at which the vertical extension 75 does not press the unlock lever 30 as shown in FIG. 13A when an operating force is no longer input to the input lever 51 by the wire cable 42.

The seat 1 according to the present embodiment is in a state in which the wire cable 42 does not pull the input lever 51 when the foot lever 41 (refer to FIG. 1) is operated to raise the seat back 3 that has been tilted forward. With the lock release mechanism 40 according to the present embodiment, when the input lever 51 does not press the release lever 52, the release lever 52 is returned to initial position NO with the urging force of the torsion coil spring 78. The seat slide device 10 according to the present embodiment fixes the slide position of the seat 1 when the lock mechanism 20 returns to a lock state in which the movement of the upper rail 6 relative to the lower rail 5 is restricted.

Further, the release lever 52 of the lock release mechanism 40 according to the present embodiment, which is pivoted by the urging force of the torsion coil spring 78, presses and pivots (clockwise in FIGS. 13A to 13C) the input lever 51 to return the input lever 51 to initial position MO at which the wire cable 42 does not pull the input lever 51. This allows the input lever 51 and the release lever 52 to be smoothly pivoted so that the lock mechanism 20 can readily perform an unlocking action when an operating force is input by the wire cable 42 again.

The support bracket 53 according to the present embodiment includes an engaging portion 81 engaged with the wire cable 42 connected to the input lever 51 in addition to the engaging portion 79, which is engaged with one end of the torsion coil spring 78. This allows the lock release mechanism 40 according to the present embodiment to be coupled to the upper rail 6 in a state in which the input lever 51, the release lever 52, the torsion coil spring 78, and a connected end of the wire cable 42 are integrally held by the support bracket 53.

The advantages of the present embodiment will now be described.

(1) The lock release mechanism 40 includes the input lever 51 and the release lever 52. The input lever 51 is pivoted by an operating force received from the wire cable 42, which serves as a transmitting member. The release lever 52 presses the unlock lever 30 and unlocks the lock mechanism 20 when pressed and pivoted by the input lever 51. The longitudinal extension 73 of the release lever 52, which extends toward the input lever 51 in the longitudinal direction of the upper rail 6 integrally includes the widthwise extension 74, which extends in the widthwise direction of the upper rail 6, and the vertical extension 75, which extends in the vertical direction. When the widthwise extension 74 of the release lever 52 is pressed by the input lever 51 from above, the vertical extension 75 presses the unlock lever 30, which is located below the input lever 51 and serves as an unlock element.

According to the above structure, the release lever 52 pressed by the input lever 51 presses the unlock lever 30 of the lock mechanism 20. This obtains superior operability. The position where the input lever 51 presses the release lever 52 and the position where the release lever 52 presses the unlock lever 30 of the lock mechanism 20 are both located between the support shaft 51x of the input lever 51 and the support shaft 52x of the release lever 52, which are lined in the longitudinal direction of the upper rail 6. This allows the lock release mechanism 40 to be reduced in size in the longitudinal direction of the upper rail 6.

Further, the structure in which the longitudinal extension 73 integrally includes the widthwise extension 74 and the vertical extension 75 increases the degree of freedom for the location of the release lever 52. This further improves the characteristics for mounting the lock release mechanism 40 on the upper rail 6 while allowing for reduction in the size of the lock release mechanism 40.

The widthwise extension 74 of the release lever 52 serves as a pressed portion for the input lever 51 so that the input lever 51 can press the release lever 52 in a stable manner. Further, the vertical extension 75 serves as a pressing portion for the unlock lever 30 so that a contact angle (angle of friction) when the release lever 52 presses the unlock lever 30 can be adjusted to be a substantially right angle. This avoids situations in which the release lever 52 becomes fixed and caught in the unlock lever 30 due to friction resulting from pressing.

(2) The upper rail 6 includes the two side walls 15, which are opposed to each other in the widthwise direction of the upper rail 6, and the upper wall 16, which connects the side walls 15. In the lock release mechanism 40, the vertical extension 75 of the release lever 52 is configured to press the unlock lever 30, which is located below the upper wall 16, through the hole 76 extending through the upper wall 16 of the upper rail 6.

According to the above structure, the lock release mechanism 40 is easily coupled to the upper rail 6 with the input lever 51 and the release lever 52 located outside the upper rail 6. Further, the vertical extension 75 of the release lever 52 is inserted into the hole 76 extending through the upper wall 16 of the upper rail 6 so that the size of the hole 76 can be minimized. This maintains the rigidity of the upper rail 6 in a preferred manner.

(3) The vertical extension 75 of the release lever 52 is spaced apart from the longitudinal extension 73 in the widthwise direction of the upper rail 6. The release lever 52 of the lock release mechanism 40 is pivoted so that the widthwise extension 74 is arranged above the side wall 15 and the upper wall 16 of the upper rail 6 between the vertical extension 75 and the longitudinal extension 73 of the release lever 52.

The above structure allows the support shaft 52x of the release lever 52 to be located at a lower position while avoiding interference between the release lever 52 and the upper rail 6. This further improves the characteristics for mounting the lock release mechanism 40 on the upper rail 6 while allowing for reduction in the size of the lock release mechanism 40.

(4) The release lever 52 includes the widthwise extension 74, which is continuous with the upper end 73c of the longitudinal extension 73, and the vertical extension 75, which is continuous with the distal end 74a of the widthwise extension 74 that is spaced apart from the longitudinal extension 73.

According to the above structure, the release lever 52, in which the longitudinal extension 73 is integral with the widthwise extension 74 and the vertical extension 75, is easily formed by bending a plate or the like. When the release lever 52 is viewed in the longitudinal direction of the upper rail 6, the longitudinal extension 73, the widthwise extension 74, and the vertical extension 75 form a substantially U-shape that is open downward. The release lever 52 is arranged as described in advantages (2) and (3) so that this further improves the characteristics for mounting the lock release mechanism 40 on the upper rail 6 while allowing for reduction in the size of the lock release mechanism 40.

(5) The lock release mechanism 40 includes the support bracket 53 fixed to the upper rail 6 while pivotally supporting the input lever 51 and the release lever 52. This easily couples the lock release mechanism 40 to the upper rail 6.

(6) The support bracket 53 includes the support wall 56 pivotally supporting the support shaft 52x of the release lever 52. In a state in which position 74x, which is where the widthwise extension 74 is pressed by the input lever 51, is arranged in the region facing the first surface 56a of the support wall 56, the release lever 52 is pivotally supported on a second surface 56b of the support wall 56, which is opposite to the first surface 56a.

According to the above structure, when the widthwise extension 74 is pressed by the input lever 51, tilting of the release lever 52 relative to the widthwise direction of the upper rail 6 is limited. Thus, the release lever 52 is smoothly pivoted and the lock release mechanism 40 is stably actuated.

(7) The lock release mechanism 40 includes the torsion coil spring 78, which serves as an urging member. The torsion coil spring 78 urges the release lever 52 in a direction opposite to the direction in which the release lever 52 is pivoted when pressed by the input lever 51. The release lever 52 of the lock release mechanism 40, which is pivoted by the urging force (elastic force) of the torsion coil spring 78, presses the pivoted input lever 51 so that the input lever 51 returns to initial position MO where no operating force is input by the wire cable 42.

According to the above structure, a return spring or the like that returns the input lever 51 to initial position MO is omitted thereby reducing the number of parts. Further, the input lever 51 and the release lever 52 are maintained in a state in which the urging force of the torsion coil spring 78 abuts the input lever 51 and the release lever 52 against each other. This reduces noise that would be generated when loosening occurs.

The above illustrated embodiment may be modified as described below. The above-described embodiment and the following modifications can be combined as long as the combined modifications remain technically consistent with each other.

In the above embodiment, the unlock lever 30 of the lock mechanism 20 that performs an unlocking action with the lock mechanism 20 by lowering and disengaging the lock spring 22 from the lower rail 5 serves as an unlock element, and the unlock lever 30 is pressed by the vertical extension 75 of the release lever 52. Instead, the lock spring 22 of the lock mechanism 20 may serve as an unlock element, and the lock spring 22 may be pressed by the release lever 52 of the lock release mechanism 40. That is, the unlock element may be of any member of the lock mechanism 20 as long as it allows the lock mechanism 20 to perform an unlocking action when the unlock element is pressed by the vertical extension 75 of the release lever 52. In the lock mechanism that includes a lock member engaged with, for example, the lower rail 5, the lock member may serve as the unlock element. The structure of the lock mechanism may also be modified so that such a lock member is pressed by the vertical extension 75 of the release lever 52.

In the above embodiment, when the release lever 52 is viewed in the longitudinal direction of the upper rail 6, the longitudinal extension 73, the widthwise extension 74, and the vertical extension 75 substantially form a U-shape, which is open downward. Instead, the arrangement of the longitudinal extension 73, the widthwise extension 74, and the vertical extension 75 may be modified as long as the release lever 52 has a structure in which the longitudinal extension 73 is integral with the widthwise extension 74 and the vertical extension 75.

The vertical extension 75 may extend continuously to the longitudinal extension 73. The vertical extension 75 may extend continuously to a side end portion of the widthwise extension 74, which is located in the longitudinal direction of the upper rail 6. The widthwise extension 74 may extend continuously to the lower end of the vertical extension 75. When the release lever 52 is viewed in the longitudinal direction of the upper rail 6, the longitudinal extension 73, the widthwise extension 74, and the vertical extension 75 may have a T-shaped form, a crank-shaped form, or the like.

In the above embodiment, the support bracket 53 is fixed to the upper wall 16 of the upper rail 6. Instead, the support bracket 53 may be fixed to the side wall 15. The support wall 55 of the input lever 51 and the support wall 56 of the release lever 52 do not necessarily have to be arranged at positions located outward in the widthwise direction from the upper rail 6.

In the above embodiment, the input lever 51 is located closer to the second end 6b of the upper rail 6 than the release lever 52, that is, toward the rear of the vehicle. Instead, the release lever 52 may be located toward the rear of the vehicle from the input lever 51.

The support bracket 53 includes the support wall 55 of the input lever 51, the support wall 56 of the release lever 52, the engaging portion 79 of the torsion coil spring 78, and the engaging portion 81 of the wire cable 42. Instead, at least one member of the lock release mechanism 40 may be directly supported by the upper rail 6 with the side walls 15, 16 (for example, by cutting out a holding portion).

In the above embodiment, the wire cable 42 that transmits an operating force as a pulling force is used as the transmitting member that inputs the operating force to the input lever 51. Instead, a transmitting member that can transmit the operating force as a pressing force may be used.

In the above embodiment, the torsion coil spring 78 is used as the urging member of the release lever 52. Instead, a compression spring or a tension spring may be used.

In the above embodiment, the lock release mechanism 40 is connected to the foot lever 41 arranged at the rear lower side of the seat cushion 2. Instead, the lock release mechanism 40 may be connected to the operation unit 38 arranged at another portion of the seat 1, such as an operation lever arranged near the shoulder of the seat back 3.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle seat slide device comprising:
    an upper rail that supports a seat located above the upper rail;
    a lower rail that supports the upper rail so that the upper rail is movable relative to the lower rail;
    a lock mechanism that restricts movement of the upper rail relative to the lower rail; and
    a lock release mechanism that permits movement of the upper rail relative to the lower rail by performing an unlocking action with the lock mechanism based on an operating force received from a transmitting member, wherein
    the lock release mechanism includes
        an input lever connected to the transmitting member, and
        a release lever that presses an unlock element of the lock mechanism and performs the unlocking action with the lock mechanism when pressed and pivoted about a support shaft by the input lever that is pivoted based on the operating force,
    the release lever includes a longitudinal extension, which extends toward the input lever in a longitudinal direction of the upper rail, a widthwise extension, which extends in a widthwise direction of the upper rail, and a vertical extension, which extends in a vertical direction of the upper rail,
    the longitudinal extension, the widthwise extension, and the vertical extension are integral,
    the release lever is configured so that the vertical extension presses the unlock element as the input lever presses the widthwise extension from above, and
    the support shaft of the release lever is located at the longitudinal extension of the release lever.

2. The vehicle seat slide device according to claim 1, wherein
    the upper rail includes two side walls, which are opposed to each other in the widthwise direction of the upper rail, and an upper wall, which connects the two side walls, and
    the lock release mechanism is configured so that the vertical extension of the release lever presses the unlock element, which is located below the upper wall, through a hole extending through the upper wall.

3. The vehicle seat slide device according to claim 1, wherein
    the widthwise extension is continuous with an upper end of the longitudinal extension, and
    the vertical extension is continuous with a distal end of the widthwise extension spaced apart from the longitudinal extension.

4. The vehicle seat slide device according to claim 1, wherein the lock release mechanism further includes a support bracket fixed to the upper rail and pivotally supporting the input lever and the release lever.

5. The vehicle seat slide device according to claim 4, wherein
    the support bracket includes a support wall that supports the support shaft of the release lever,
    the support wall includes a first surface and a second surface at an opposite side of the first surface, and
    in a state in which a position at which the widthwise extension is pressed by the input lever is located in a region facing the first surface of the support wall, the release lever is pivotally supported on the second surface of the support wall.

6. The vehicle seat slide device according to claim 1, wherein
    the lock release mechanism further includes an urging member that urges the release lever in a direction opposite to a direction in which the release lever is pivoted when the release lever is pressed by the input lever, and
    the lock release mechanism is configured so that the release lever, which is pivoted based on an urging force of the urging member, presses the input lever when the operating force is not received from the transmitting member.

* * * * *